US012810531B2

(12) United States Patent
Troy et al.

(10) Patent No.: US 12,810,531 B2
(45) Date of Patent: Nov. 24, 2026

(54) COMPUTING SYSTEM FOR ALIGNING 3D SCAN DATASETS

(71) Applicant: The Boeing Company, Arlington, VA (US)

(72) Inventors: James J. Troy, Issaquah, WA (US); William Dwyer McGarry, Federal Way, WA (US); Rohan Jayantilal Rana, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 99 days.

(21) Appl. No.: 18/734,818

(22) Filed: Jun. 5, 2024

(65) Prior Publication Data

US 2025/0378626 A1 Dec. 11, 2025

(51) Int. Cl.
*G06T 15/08* (2011.01)
*G06T 7/33* (2017.01)

(52) U.S. Cl.
CPC .............. *G06T 15/08* (2013.01); *G06T 7/344* (2017.01); *G06T 2207/10028* (2013.01); *G06T 2207/30108* (2013.01)

(58) Field of Classification Search
CPC ..................... G06T 15/08; G06T 7/344; G06T 2207/10028; G06T 2207/30108
See application file for complete search history.

(56) References Cited

U.S. PATENT DOCUMENTS 10,540,813 B1 * 1/2020 Uhlenbrock ........ G06F 16/9027
10,591,288 B2 * 3/2020 Farniok .................. G06Q 10/20

OTHER PUBLICATIONS

Schaub, Linus, et al. "Point cloud to BIM registration for robot localization and Augmented Reality." 2022 IEEE International Symposium on Mixed and Augmented Reality Adjunct (ISMAR-Adjunct). IEEE, 2022.*

Zhu, Zicheng, et al. "Exploring the Impact of Different Registration Methods and Noise Removal on the Registration Quality of Point Cloud Models in the Built Environment: A Case Study on Dickabrma Bridge." Buildings 13.9 (2023): 2365.*

Schaub, L. et al., "Point cloud to BIM registration for robot localization and Augmented Reality," Proceedings of the 2022 IEEE International Symposium on Mixed and Augmented Reality Adjunct (ISMAR-Adjunct), Oct. 17, 2022, Singapore, 8 pages.

(Continued)

*Primary Examiner* — Alicia M Harrington
*Assistant Examiner* — Hyorim Park
(74) *Attorney, Agent, or Firm* — Alleman Hall LLP

(57) ABSTRACT

A computing system for aligning laser scan data is provided, including a processor configured to obtain multiple scan point sets, each set including a plurality of scan points that represent an outer surface of a target object. The processor is configured to generate a voxel map including an outer surface voxel layer for the target object, and compute a respective transformation matrix for each of the scan point sets. The processor is configured to apply the respective transformation matrix for each scan point set to the scan points in the respective scan point set to thereby transform a position of each of the scan points in each scan point set that lies partially or wholly outside of the outer surface voxel layer to a modified position within the outer surface voxel layer, to thereby generate respective transformed scan point sets containing the scan points at the modified positions.

20 Claims, 11 Drawing Sheets

(56) References Cited

OTHER PUBLICATIONS

Shah, H. et al., "GPU-Accelerated Collision Analysis of Vehicles in a Point Cloud Environment," IEEE Computer Graphics and Applications, vol. 42, Issue 5, Sep.-Oct. 2022, 14 pages.
European Patent Office, Extended European Search Report Issued in Application No. 25177822.1, Sep. 22, 2025, 9 pages.
Günther, M et al., "Model-Based Object Recognition from 3D Laser Data," Proceedings of the 34th Annual German Conference on AI (KI 2011), Oct. 4, 2011, Berlin, Germany, 12 pages.
Zhu, Z. et al., "Exploring the Impact of Different Registration Methods and Noise Removal on the Registration Quality of Point Cloud Models in the Built Environment: A Case Study on Dickabrma Bridge," Buildings, vol. 13, Issue 9, Sep. 16, 2023, 27 pages.
"Gradient descent," Wikipedia, Available Online at https://en.wikipedia.org/wiki/Gradient_descent, retrieved on Mar. 7, 2024, 8 pages.
Mcneely, W.A. et al., "Six Degree-of-Freedom Haptic Rendering Using Voxel Sampling," Proceedings of the 26th International Conference on Computer Graphics and Interactive Techniques (SIGGRAPH 99), Aug. 8, 1999, Los Angeles, CA, 8 pages.
Mcneely, W.A et al., "Voxel-Based 6-DOF Haptic Rendering Improvements," Haptics-e, vol. 3, No. 7, Jan. 2006, 12 pages.

* cited by examiner

TRANSFORMATION MATRIX OPERATIONS 98

INDIVIDUAL SCAN POINT: $\boldsymbol{P}_1 = \begin{bmatrix} X1 \\ Y1 \\ Z1 \end{bmatrix}$ ARRAY OF SCAN POINTS: (FROM *1* TO *n*) $[\boldsymbol{P}_1 \quad \boldsymbol{P}_2 \quad \cdots \quad \boldsymbol{P}_n] = \begin{bmatrix} X1 & X2 & \cdots & Xn \\ Y1 & Y2 & \cdots & Yn \\ Z1 & Z2 & \cdots & Zn \end{bmatrix}$ $$\begin{bmatrix} r11 & r12 & r13 & Px \\ r21 & r22 & r23 & Py \\ r31 & r32 & r33 & Pz \\ 0 & 0 & 0 & 1 \end{bmatrix} \begin{bmatrix} X1 & X2 & \cdots & Xn \\ Y1 & Y2 & \cdots & Yn \\ Z1 & Z2 & \cdots & Zn \\ 1 & 1 & 1 & 1 \end{bmatrix} = \begin{bmatrix} X1' & X2' & \cdots & Xn' \\ Y1' & Y2' & \cdots & Yn' \\ Z1' & Z2' & \cdots & Zn' \\ 1 & 1 & 1 & 1 \end{bmatrix}$$

TRANSFORMATION MATRIX — ARRAY OF *n* SCAN POINTS — TRANSFORMED ARRAY OF *n* SCAN POINTS

FIG. 7

COMPUTING SYSTEM FOR ALIGNING 3D SCAN DATASETS

FIELD

The field of invention relates generally to tools for automatically aligning three-dimensional (3D) scan datasets to accurately represent the dimensions of a target object.

BACKGROUND

Capturing an accurate and comprehensive laser scan of an object as large as an airplane presents significant challenges. The process involves acquiring scan data from various angles, including the underside, top, and intricate features or spaces. Additionally, meticulously merging and scaling these datasets during post-processing requires substantial effort, time, and operational cost. To address these complexities, various methods for aligning three-dimensional (3D) scan datasets have been developed.

For instance, existing point scan alignment methods include an external tracking system, simultaneous localization and mapping (SLAM) techniques, deliberately placed markers, and other approaches. However, these existing alignment methods are not without their limitations. Firstly, accurately aligning and scaling scans without reference points remains a challenge. Secondly, there is no robust process to confirm that the data acquired from the laser scanning process adheres to accurate dimensions. Thirdly, the scalability and speed of prior point-to-surface alignment methods fall short when dealing with the vast datasets encountered in commercial airplane laser scanning. Consequently, existing data scan alignment methods face challenges such as precise alignment without references, lack of dimension verification, and scalability constraints. Similar issues are faced when aligning scan data from other types of large objects, and other smaller objects that have been scanned from multiple angles.

SUMMARY

In view of these issues, a computing system for aligning laser scan data is provided. According to one aspect, the computing system comprises a processor coupled to a memory that stores instructions, which, upon execution by the processor, cause the processor to obtain multiple scan point sets, each set including a plurality of scan points that represent an outer surface of a target object. The processor is further configured to generate a voxel-based representation (voxel map) including an outer surface voxel layer for the target object. The processor is further configured to compute a respective transformation matrix for each of the scan point sets of scan points that fits the scan points in each set to positions within the outer surface voxel layer. The processor is further configured to apply the respective transformation matrix to the scan points in the respective scan point set to thereby transform (move) a position of each of the scan points in each scan point set that lies partially or wholly outside of the outer surface voxel layer to a modified position within the outer surface voxel layer, to thereby generate respective transformed scan point sets containing the scan points at the modified positions. The processor is further configured to output the transformed scan point sets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows example transformation matrix operations used by the iterative parameter space search algorithm of the fit error minimization operation of FIG. 6.

DETAILED DESCRIPTION

Figure 1:
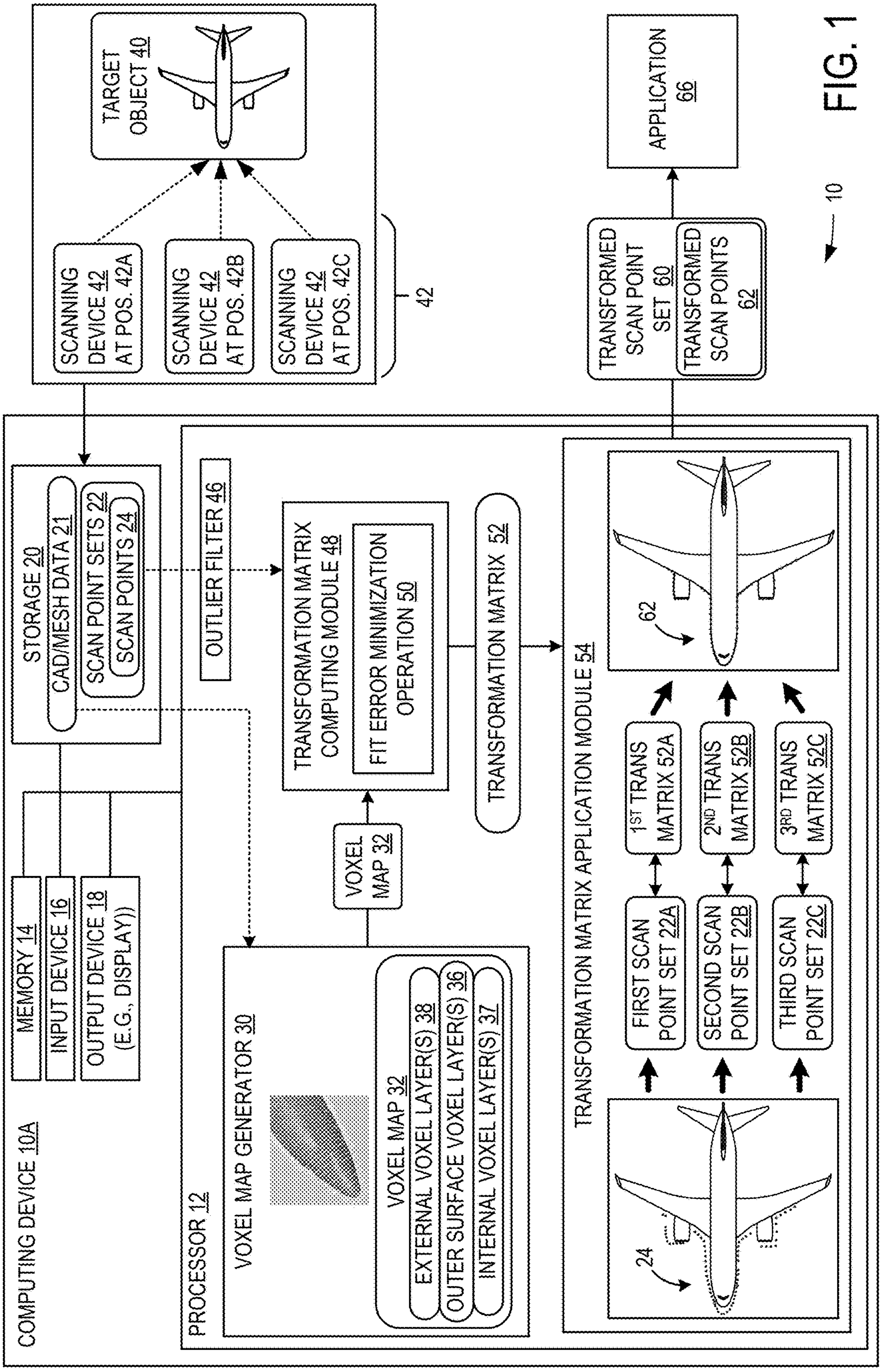
FIG. 1 shows a schematic view of an example computing system for aligning laser scan data according to one example implementation of the present disclosure.

As discussed above, existing laser scan data alignment methods encounter challenges such as precise alignment without references, lack of dimension verification, and scalability constraints. To address the issues identified above, computing systems and computerized methods for aligning 3D datasets of laser scan data are disclosed herein. FIG. 1 shows a computing system 10 including a processor 12 coupled to a memory 14 that stores instructions, which, upon execution by the processor, cause the processor 12 to perform certain functions as described below. In the depicted configuration, the computing system 10 may include the processor 12, memory 14, and storage 20, which may be operatively coupled to each other by a communications bus. The processor 12, memory 14, and storage 20 may each be configured as one or more physical components such as one or more processor cores and/or one or more physical memory modules. The storage stores the instructions for the various software components described herein as being executed by the processor 12 in a non-volatile manner. The storage 20 further stores CAD and mesh data 21 and scan point sets 22 used by those software components. The computing system 10 may further include an input device 16, which may be a keyboard, a mouse, a touchscreen, a trackpad, an accelerometer, a microphone, or some other suitable type of input device. In addition, the computing system 10 may further include an output device 18, which may be a display, a speaker, or some other suitable type of output device. The computing system 10 may further include a network interface configured to communicate over a network. The computing system 10 may be any type of a variety of types of computing devices, such as a laptop, desktop, or server. Furthermore, the computing system 10 may be one of a plurality of server devices in a data center, and the processor 12 may be one processor of a single server device or multiple processors of multiple server devices. Further aspects of example computing system configurations are explained below with reference to FIG. 11.

Upon execution by the processor 12, the instructions stored in the memory 14 cause the processor 12 to obtain multiple scan point sets 22. The scan points can be obtained by reading from storage 20 or memory 14, for example. Each scan point set 22 includes a plurality of scan points 24 that represent an outer surface of a target object 40. The multiple scan point sets 22 are captured by a scanning device 42, such as a laser scanner, positioned at a plurality of different locations 42A, 42B, 42C, while scanning the target object 40. A single scanning device can be used and moved to the different scanning positions 42A, 42B, and 42C. Alternatively, it will be appreciated that multiple scanning devices 42 can be positioned at the different scanning positions 42A, 42B, and 42C. The scanning device 42 transfers the scan point sets 22 via a communication link to the computing device 10A for storage in storage 20. The target object 40 may be an aircraft, rocket, spacecraft, or satellite, as some examples. Other target objects are also contemplated.

Figure 2:
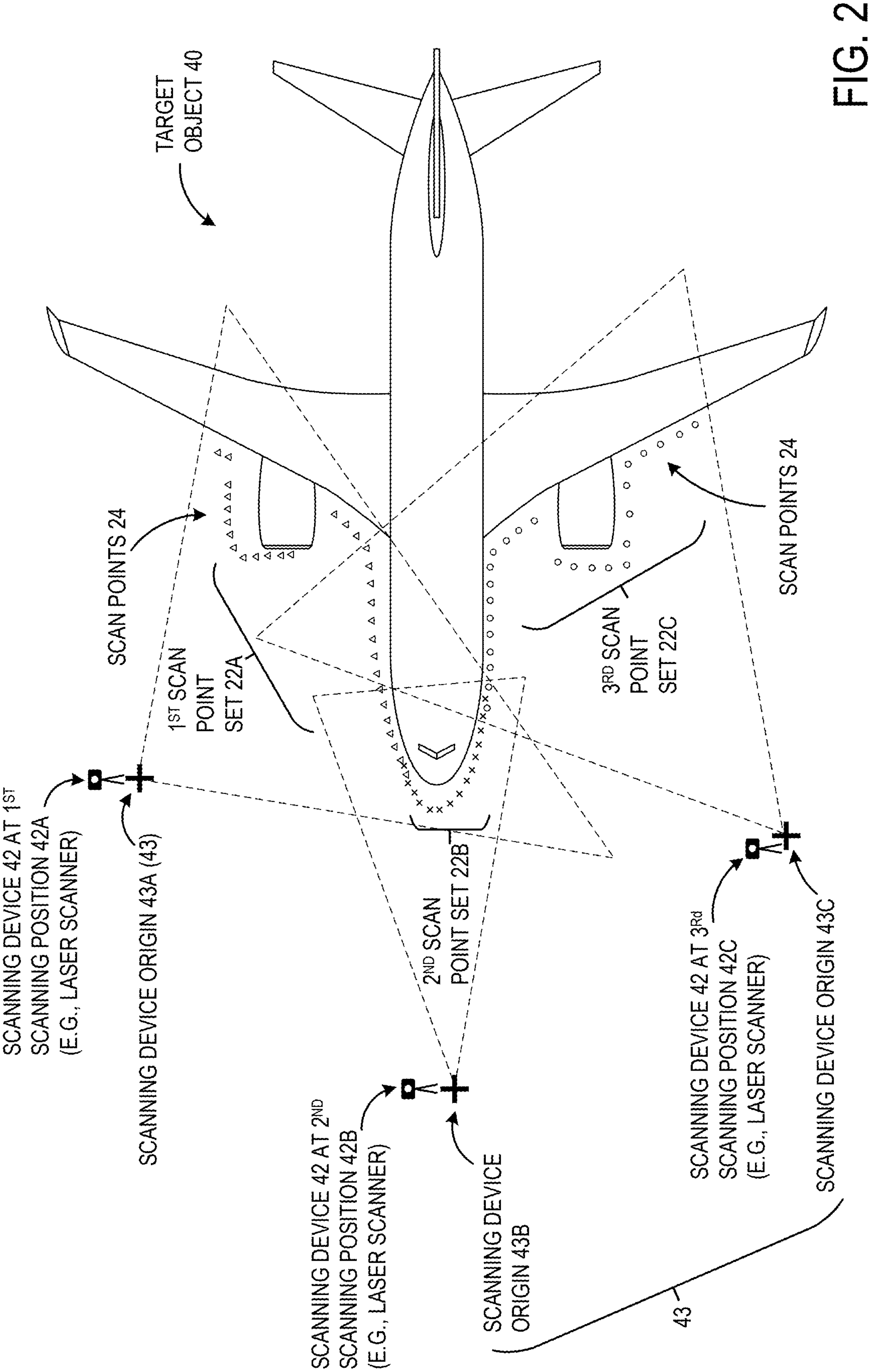
FIG. 2 shows a schematic view of an example target object and scanning device of the computing system of FIG. 1, which capture multiple scan point sets from the target object.

Briefly turning to FIG. 2, this figure shows a schematic view of an example target object 40 and scanning device 42 of computing system 10 that captures multiple scan point sets 22 from the target object 40. In the depicted example, three scan point sets 22A, 22B, and 22C are captured by the scanning device 42 (e.g., laser scanner) at a first scanning position 42A, a second scanning position 42B, and a third scanning position 42C, respectively, from the outer surface of the aircraft, which serves as the target object 40. The scanning device origin 43A, 43B, 43C for each scan point set 22 is positioned at a respective location external to the target object 40. In this example, the scanning device 42 at each scanning position 42A, 42B, 42B aims at different areas of the outer surface of the target object 40, ensuring that the desired region of interest is captured. In other examples, only a portion of the external surface may be scanned. The scanning point sets 22A, 22B, 22C including scanning points 24 captured by the scanning device 42 are transmitted to the computing system 10. The scan points 24 in each scan point set 22 are defined by vectors originating from the scanning device origin 43 for the scan point set 22 and extending to respective positions of the scan points 24 in three-dimensional space. During alignment, these vectors are transformed, for example, by adding another vector to each vector defining the scan points, thereby resulting in transformed scan point vectors defining the transformed scan points, as discussed below in relation to FIG. 5.

Turning back to FIG. 1, the processor 12 is further configured to generate, via a voxel map generator 30, a voxel map 32 including an outer surface voxel layer 36 for the target object 40. The CAD data 21 may be used to generate the voxel map 32. It will be appreciated that a CAD program is used to produce the CAD data 21. The CAD data can be an outer mold line (OML) model generated by the CAD program. The OML model is a model that is generated from a more complex CAD model of the target object (e.g., one that may contain interior surfaces of interior components, etc.) and only includes a single surface that defines the outer mold line (i.e., outer surface) of the more complex model, with interior surfaces removed. After the OML model is generated voxelization is performed on the OML model, to thereby generate the voxel map 32. The voxel map 32 may further include an internal voxel layer 37 and an external voxel may layer 38, and the outer surface voxel layer 36 may be arranged between the internal voxel layer 37 and the external voxel may layer 38. Further, it will be appreciated that the surface voxel layer is illustrated as one voxel in depth, and the interior and exterior voxel layers may have a depth of more than one voxel. The outer surface voxel layer 37 approximates the outer surface of the target object 40 or a region thereof.

Figure 3:
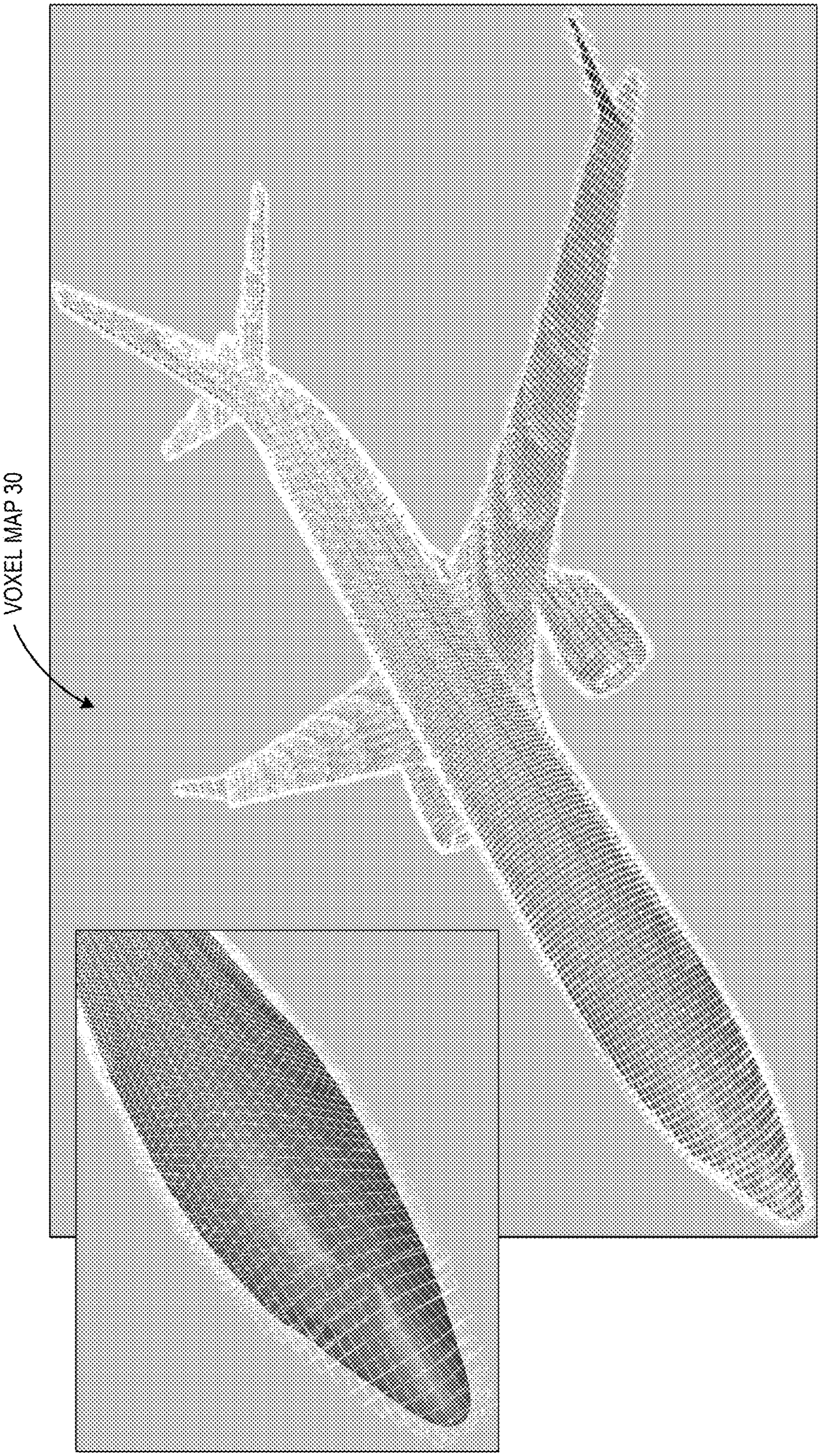
FIG. 3 shows a schematic view of an example voxel map for the target object of the computing system of FIG. 1.

Briefly turning to FIG. 3, this figure shows a schematic view of an example voxel map 32 representing the outer surface voxel layer associated of the target object 40. The voxel map generator 30 provides collision detection and proximity information using a voxel-based representation of the three-dimensional target object and environment. During collision detection, the interaction of polygonal models converted into voxels (voxel map) and groups of points ("point shell") are analyzed. A point shell is a point cloud, and may define a partial surface, thus appearing as a "shell". The process entails sampling the voxel map at each surface point to derive an estimate of the distance from the voxelized surface representation to the scan point. As discussed above, the voxel map 32 includes three distinct regions: the outer surface voxel layers 36, the internal voxel layers 37, and the external voxel layers 38. The outer surface voxel layer 36 is the layer that corresponds to the outer surface of the target object 40, which results in a "0" error (see FIG. 4). The internal voxel layer 37 is the layer that corresponds to the inside of the outer surface of the target object 40, which results in a "−1, −2, −3 . . . " error (see FIG. 4). The external voxel layer 38 is the layer that corresponds to the outside of the outer surface of the target object 40, which results in a "+1, +2, +3 . . . " error (see FIG. 4). This error value is a proximity estimate of the distance from the outer layer surface for each point, which is an integer number (rounded up) of voxels separating the point from the surface of the outer layer. Put another way, the error represents the number of voxels the scan point must be transformed to lie within the outer surface voxel layer. Although the resulting distance measurement is an approximation of the point's offset from the OML surface, it is a limited (bounded) error that provided that provides a computationally efficient solution. This proximity estimate offers a practical and sufficient indication of distance and direction, particularly for the subsequent iterative alignment method.

Turning back to FIG. 1, the processor 12 is further configured to compute, via a transformation matrix computing module 48, a respective transformation matrix 52 for each of the scan point sets 22 of scan points 24 that fits the scan points 24 in each set 22 to positions within the outer surface voxel layer 36 of the voxel map 30. The transformation matrix computing module 48 receives the voxel map 32 and the scan point sets 22 including scan points 24 to compute the respective transformation matrix 52. The processor 12 is configured to remove, via an outlier filter 46, anomalies in each respective scan point set 22 prior to computing the respective transformation matrix 52. For each scan point set 22, to compute the transformation matrix 52, the processor 12 is configured to perform, via the transformation matrix computing module 48, a fit error minimization operation 50.

Figure 4:
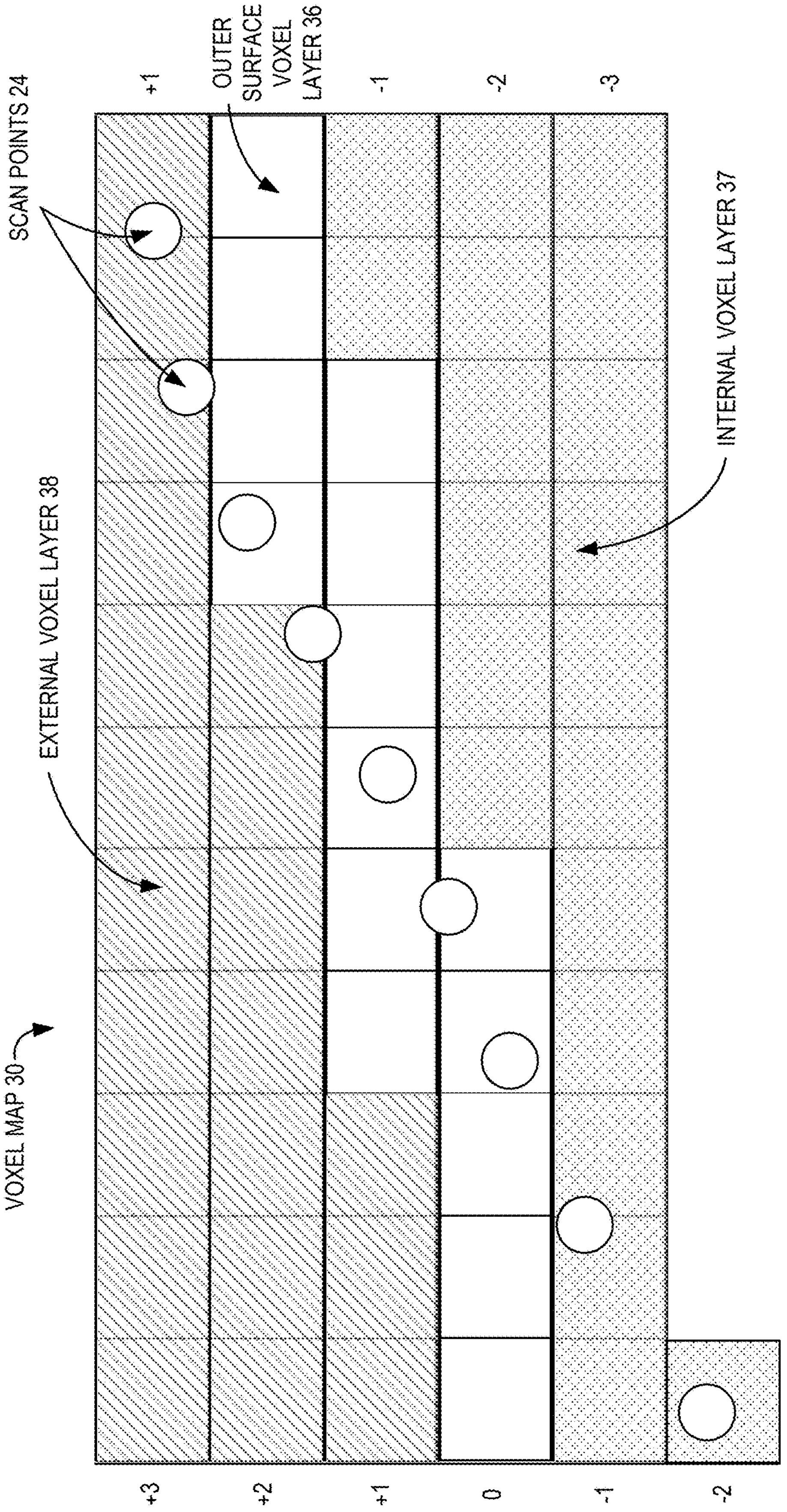
FIG. 4 is a simplified two-dimensional representation of a portion of the voxel map of FIG. 3, showing example scan points that lie in an outer surface voxel layer, internal voxel layer, and external voxel layer of the voxel map.

Briefly turning to FIG. 4, this figure shows a schematic view of an example of scan points 24 that lie in the outer surface voxel layer 36, internal voxel layer 37, and external voxel layer 38. Thus, the scan points are misaligned with the outer surface layer of the target object. As shown, three scan points lie within the outer surface voxel layer 36, three scan points are positioned +1 voxels away from the outer surface voxel layer in the external voxel layer 38, and one scan point lies in −1 voxel away from the outer surface voxel layer in the internal voxel layer 37, and one scan point lies −2 voxels away from the outer surface voxel layer in the internal voxel layer 37. The computation of these distance values is described further below. The fit error minimization operation 50, as described in detail below, computes a transformation with an estimated minimum error that can be used to move the set of scan points 22 so that each of the individual scan points 24, which lie in the internal voxel layer 37 or the external voxel layer 38, either partially or wholly, are moved so that they are located within the outer surface voxel layer 36.

Figure 5:
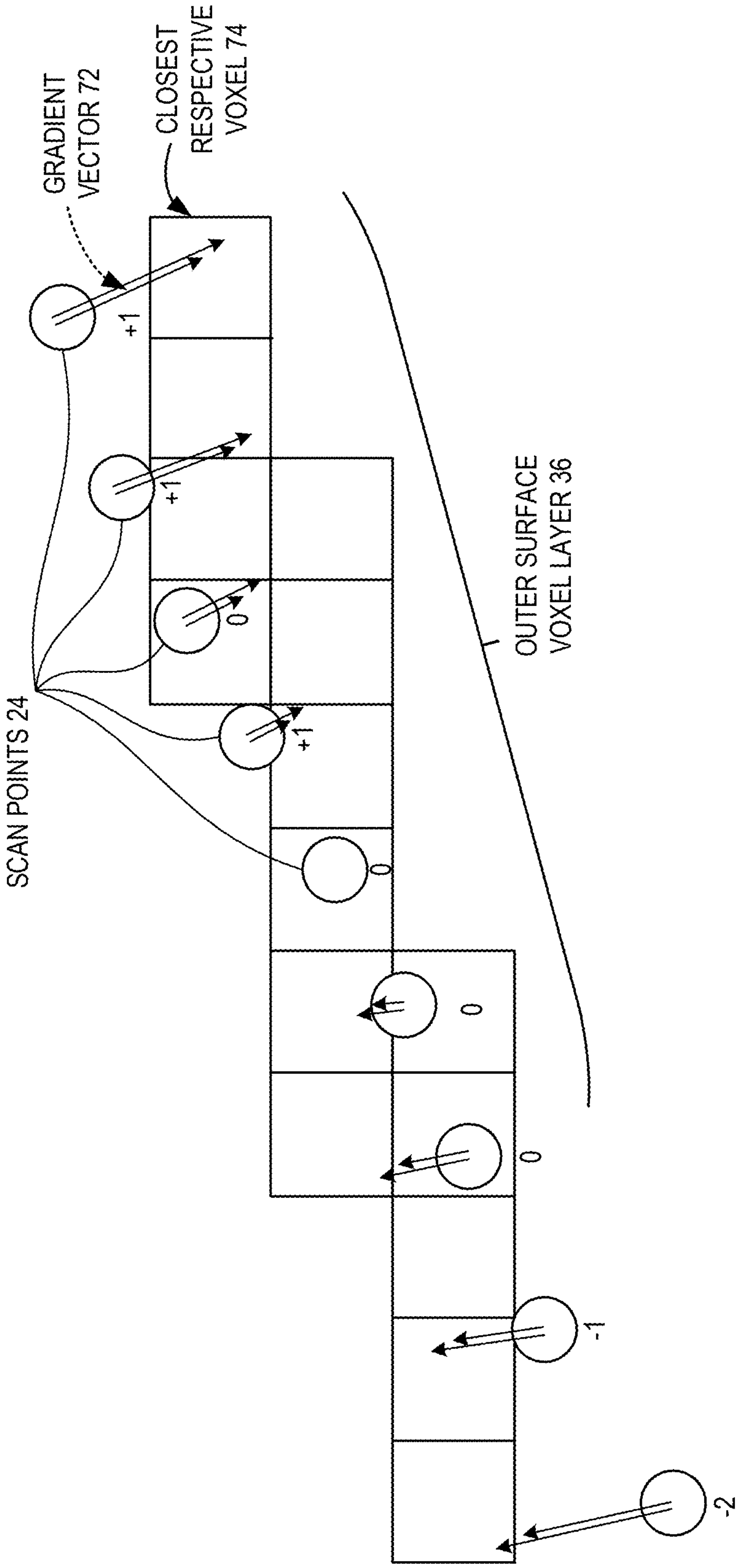
FIG. 5 shows the example scan points of the simplified representation of the voxel map of FIG. 4, with gradient vectors computed for each scan point via a fit error minimization operation, to fit the scan points to be within the outer surface voxel layer.

To accomplish the fit error minimization operation 50, the processor 12 is configured to, for each scan point set 22, iteratively determine a gradient vector 72 between each scan point 24 in the respective scan point set 22 and a closest respective voxel 74 in the outer surface voxel layer 36, beginning with an initial set of values for the transformation matrix. Briefly turning to FIG. 5, this figure shows a schematic view of example scan points 24 that are transformed to the outer surface voxel layer 36 via the fit error minimization operation 50. As shown at FIG. 5, the gradient vector 72 between is determined each scan point 24 in the respective scan point set 22 and the closest respective voxel 74 in the outer surface voxel layer 36. Rather than being a precise distance, the gradient vector is an estimation of the error generated by performing a comparison between each scan point in the point shell and the outer surface voxel layer using the three-dimensional voxel-based collision detection algorithm described above. The comparison process is as follows: at the lowest level, a point-versus-voxel check determines whether a point and a voxel occupy the same space. During the voxelization of the target object, which is pre-computed before run-time collision/proximity checking, data is encoded into the voxel to indicate whether a specific voxel is a surface voxel, interior voxel, or exterior voxel. For interior and exterior voxels, the distance from the surface is also encoded in the voxel data storage method, measured in voxel dimensions. The number of different proximity values that each voxel may have (for interior or exterior voxel offsets from the surface) is determined by the number of data storage bits specified before the voxelization process. More proximity levels for each voxel require additional memory to store the voxel representation of the target object. During run-time operation, the method references the pre-computed voxelized representation to determine the value of any voxel occupied by the point being checked. These voxel values are then used by the method described in the present disclosure to determine how to adjust the point datasets to align with the OML surface.

Figure 6:
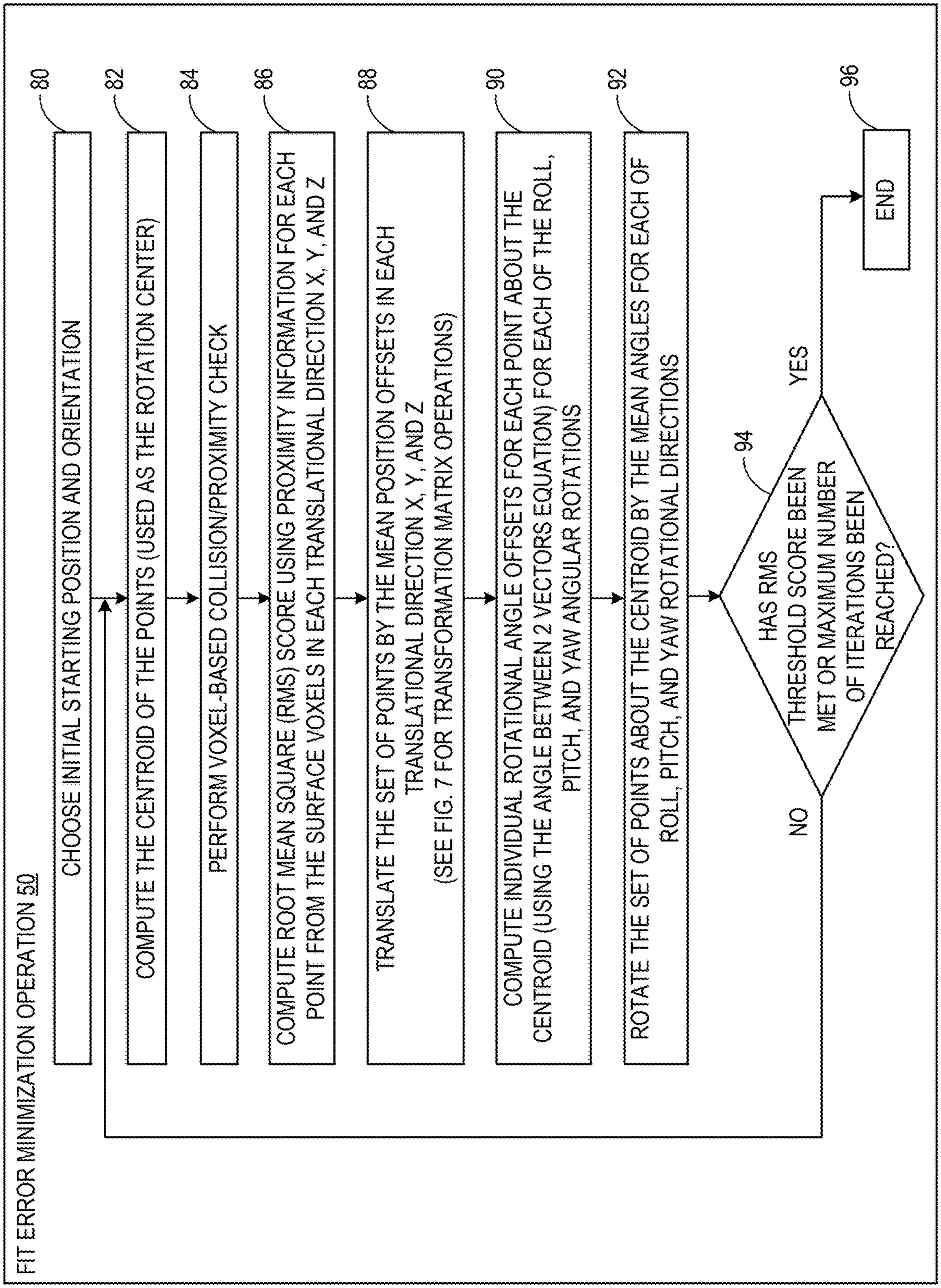
FIG. 6 is a schematic view of an iteration loop of the iterative parameter space search algorithm of the fit error minimization operation used by the computer system of FIG. 1.

The processor 12 is further configured to compute a candidate transformation matrix according to a parameter space search algorithm. The parameter space search algorithm may be an exhaustive search algorithm or an iterative optimization algorithm. As shown in FIG. 6, the fit error optimization operation 50 iterates in a loop in which the transformation matrix is permuted and optimized by a process that receives the computed aggregate error from all scan points in a scan point set, and uses one of these algorithms (i.e., exhaustive search or iterative optimization such as gradient descent) to optimize the permuted values in the candidate transformation matrixes. First, at 80, an initial starting position and orientation are chosen. Next, at 82, a centroid of the scan points in the scan point set is computed. This centroid is used as the rotation center for the transformation of the scan points in the scan point set. At 84, voxel-based collision/proximity check is performed. Further, at 86, root mean square (RMS) score using the computed proximity information for each scan point from the surface voxels in each translational direction x, y, and z is computed. At 88, the set of points is translated by the mean position offsets in each translational direction x, y, and z using transformation matrix operations, as shown at FIG. 7 in detail. Next, at 90, individual rotational angle offsets for each point about the centroid (using the equation for the angle between two vectors) for each of the roll, pitch, and yaw angular rotations are computed. At 92, the set of points about the centroid is rotated by the mean angles for each of roll, pitch, and yaw rotational directions. At 94, it is determined whether the RMS threshold score has been met or the maximum number of iterations has been reached. When the RMS threshold score has been met or the maximum number of iterations has been reached at 94, the operation ends at 96. When the RMS threshold score has not been met or the maximum number of iterations has not been reached at 94, the operation loops back to 82, as shown in FIG. 6.

The exhaustive search algorithm systematically explores all possible discretized positions and orientations within a specified range. It does so by incrementally moving points and conducting a Voxmap PointShell (VPS)-based collision/proximity check. During each iteration, proximity information for each point is tracked. The algorithm computes an aggregate statistical score, such as a root mean square (RMS) score, using this proximity data. Scores are recorded for every combination of position and orientation, with both parameters incremented by the specified step size. Finally, after completing all iterations within the specified range, the method selects the combination with the lowest score.

The iterative optimization algorithm may be based on a gradient descent algorithm. The gradient descent algorithm is an iterative first-order optimization algorithm commonly used in optimization methods. Its primary purpose is to find a local minimum or maximum of a given function by iterating (moving) in the direction provided by the gradient information. This approach determines how to adjust the set of scan points by conducting a VPS-based collision check, while meticulously monitoring proximity information for each point. The alignment method then computes the root mean square (RMS) score using the proximity data from each point. Subsequently, this proximity information guides the determination of translation and/or rotation directions for the points dataset. The process entails iteratively performing the VPS check and scoring the results. The method halts either when a threshold score is reached or when the maximum number of iterations for position and rotation has been attained. This process may be based on the gradient descent algorithm, customized to utilize discrete voxel-based proximity data for a set of points in 6D space.

Based on the parameter space search algorithm, the processor 12 is configured to compute an alignment score for the respective scan point set 22 based on the gradient vector 72 for each of the scan points 24 in the respective scan point set 22. and if the alignment score is within a permissible error threshold, the processor 12 is configured to cease iterating and output the candidate transformation matrix as the transformation matrix 52, else, continue iterating. The transformation matrix 52 may be a 4×4 homogeneous transformation matrix for each set 22 of the scan points 24.

Figure 8:
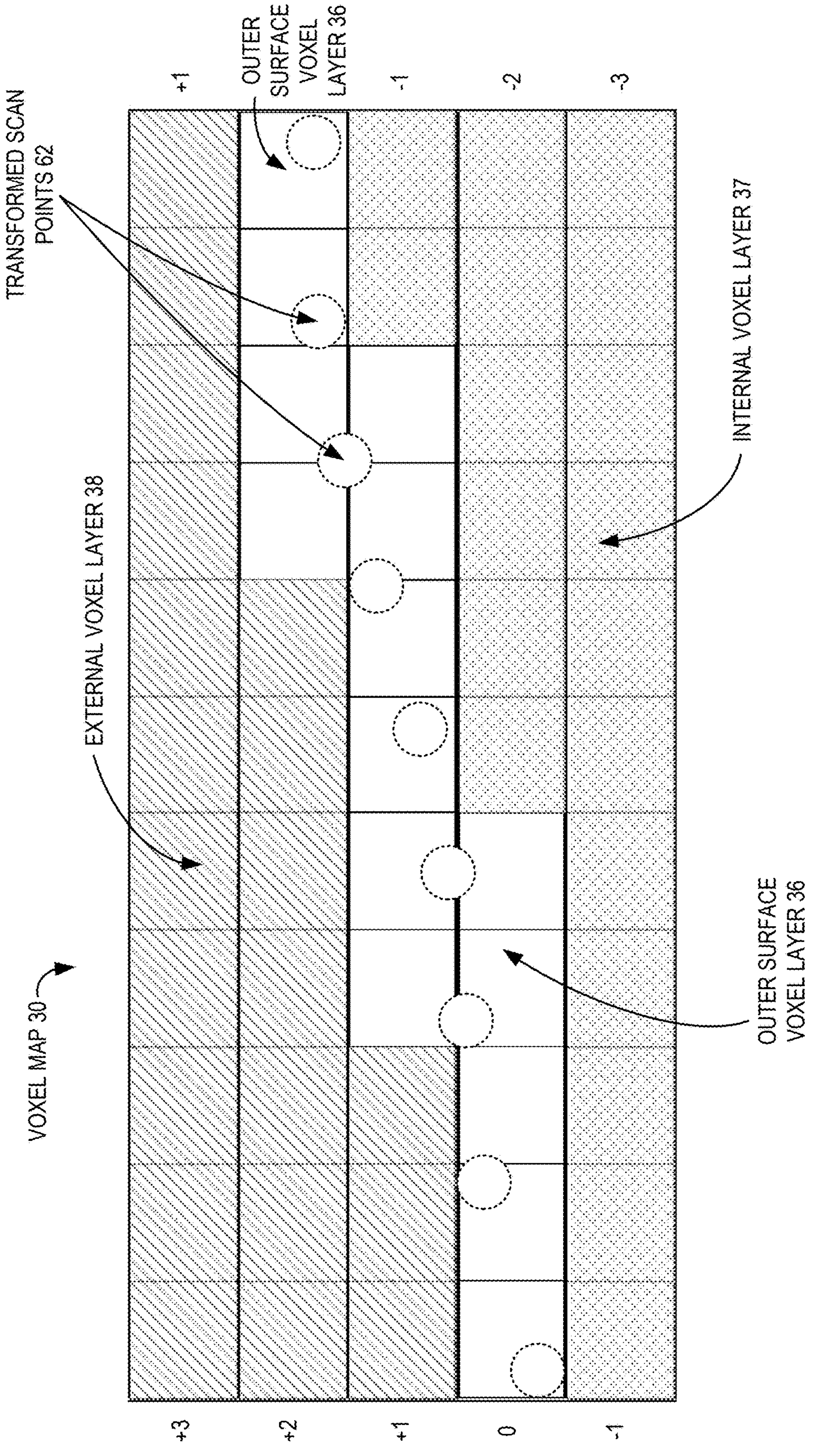
FIG. 8 shows a schematic view of example transformed scan points from FIG. 5 that lie within the outer surface voxel layer.
Figure 9:
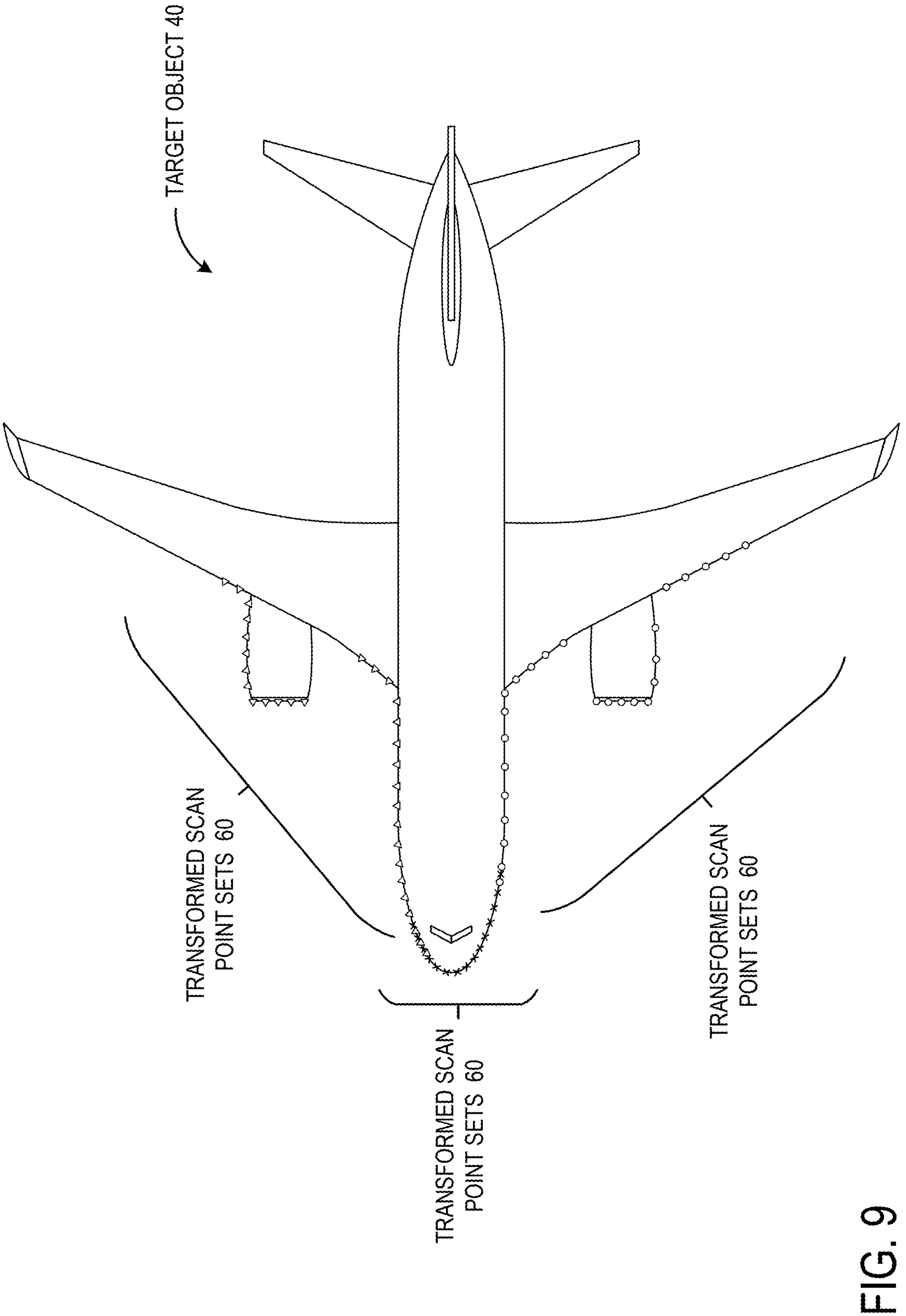
FIG. 9 shows a schematic view of multiple transformed scan point sets formed by transformed scan points such as those illustrated in FIG. 8, which are each aligned with the target object.

Turning back to FIG. 1, the processor 12 is further configured to apply, via a transformation matrix application module 54, the respective transformation matrix 52A, 52B, 52C for each scan point set 22A, 22B, 22C to the scan points 24 in the respective scan point set 22 to thereby transform a position of each of the scan points 24 in each scan point set 22 that lies partially or wholly outside of the outer surface voxel layer 36 to a modified position within the outer surface voxel layer 36, to thereby generate respective transformed scan point sets 60 containing the scan points 62 at the modified positions. This corresponds to the compute distance operation of FIG. 6. Briefly turning to FIG. 8, this figure shows a schematic view of example transformed scan points 62 that lie within the outer surface voxel layer 36 after applying the respective transformation matrix 52 to the scan points 24 in the respective scan point set 22. As shown at FIG. 8, all the transformed scan points 62 are arranged within the outer surface voxel layer 36 that corresponds to the outer surface of the target object 40. Briefly turning to FIG. 9, this figure shows a schematic view of example transformed scan point sets 60 that are aligned with the outer surface of the target object 40. Although in this example all the scan points are illustrated as within the outer surface voxel layer, it will be appreciated that the minimum solution found by the iterative parameter space search algorithm may not position all scan points within the outer surface voxel layer. Rather it attempts to minimize the error as determined by the point shell to voxel map comparison, which is more efficient than a brute force (exhaustive) computation of the exact error on each iteration.

Turning back to FIG. 1, the processor 12 is further configured to output the transformed scan point sets 60. The transformed scan point sets 60 may be output to an application 66 that is configured to assess a condition of the target object 40. The condition may be whether the target object 40 is built to manufacturing tolerance threshold or whether the target object 40 has experienced damage that exceeds a damage tolerance threshold. As an example of a manufacturing tolerance threshold, the outer surface of the built part might be specified to be within 1 mm of a CAD model of the part, and the scan data may be used to determine if this threshold is met. As an example of the damage tolerance, a fuselage scanned during maintenance may be required to be within +/−1 mm of its original outer shape as-built, or maintenance may be required, such as a dent repair.

Figure 10:
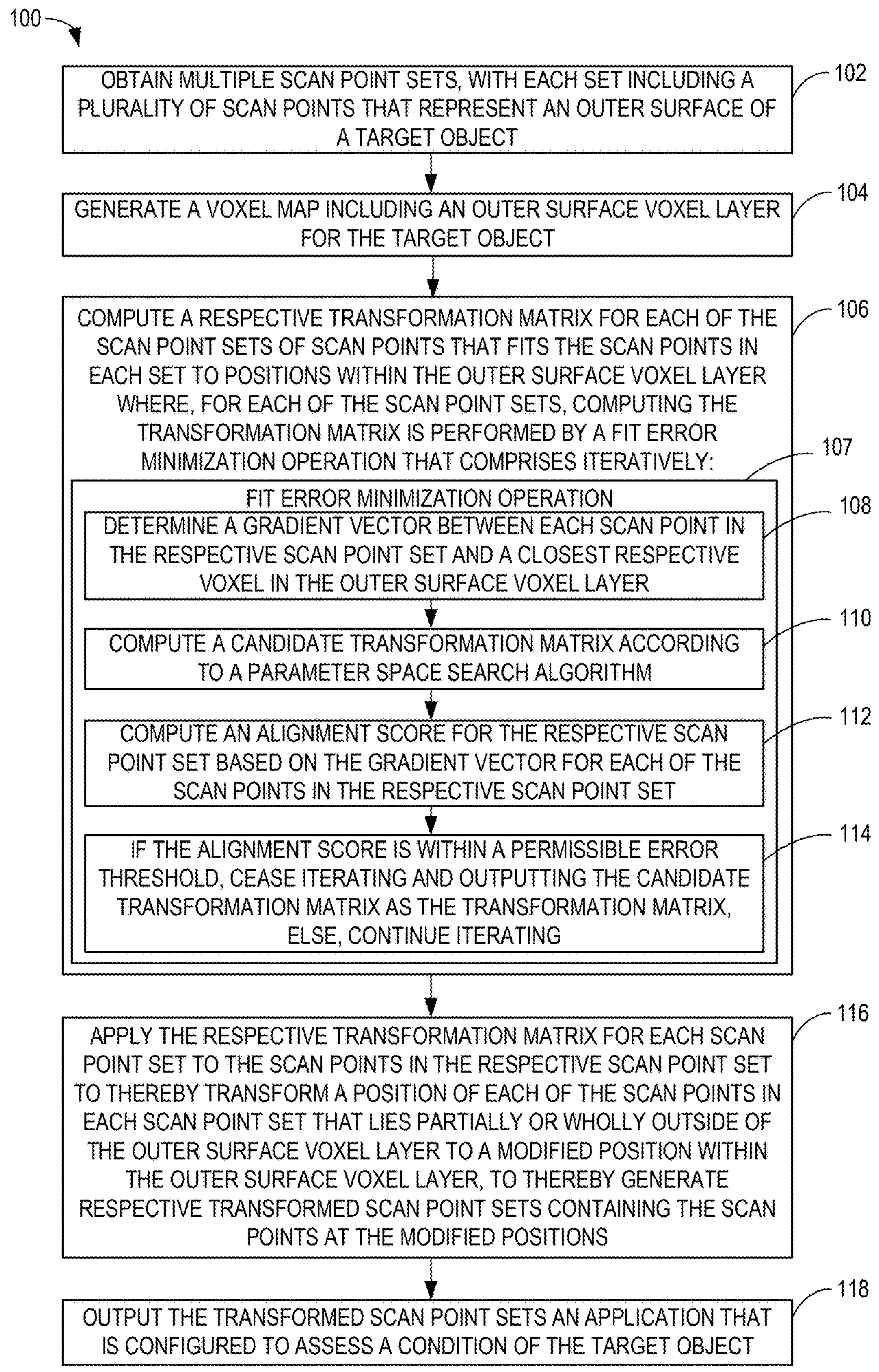
FIG. 10 shows a flowchart of a computerized method for aligning laser scan data according to one example configuration of the present disclosure.

FIG. 10 is a flowchart of a computerized method 100 for aligning laser scan data according to one example configuration of the present disclosure. The method 100 may be implemented using the computer hardware and software described above, or using other appropriate computer hardware and software.

At step 102, the method 100 may include obtaining multiple scan point sets, with each set including a plurality of scan points that represent an outer surface of a target object. Proceeding from step 102 to step 104, the method 100 may include generating a voxel map including an outer surface voxel layer for the target object.

Advancing from step 104 to step 106, the method 100 may include computing a respective transformation matrix for each of the scan point sets of scan points that fits the scan points in each set to positions within the outer surface voxel layer where, for each of the scan point sets, computing the transformation matrix is performed by a fit error minimization operation, illustrated at 107. The fit error minimization operation shown at 107 may include, for each scan point set, iteratively cycling through steps 108 through 114. Step 108 includes determining a gradient vector between each scan point in the respective scan point set and a closest respective voxel in the outer surface voxel layer. Step 110 includes computing a candidate transformation matrix according to a parameter space search algorithm. Step 112 includes computing an alignment score for the respective scan point set based on the gradient vector for each of the scan points in the respective scan point set. Step 114 includes, if the alignment score is within a permissible error threshold, ceasing iterating and outputting the candidate transformation matrix as the transformation matrix, else, continuing iterating through steps 108-114 of the fit error minimization operation 107.

Continuing from step 114 to step 116, the method 100 may further include applying the respective transformation matrix for each scan point set to the scan points in the respective scan point set to thereby transform a position of each of the scan points in each scan point set that lies partially or wholly outside of the outer surface voxel layer to a modified position within the outer surface voxel layer, to thereby generate respective transformed scan point sets containing the scan points at the modified positions.

At step 118, the method 100 may further include outputting the transformed scan point sets to an application that is configured to assess a condition of the target object.

The computing system 10 and method 100 described herein provide mechanisms for aligning scan points effectively. The computing system 10 and method 100 offer an automated process that requires no external tracking system, markers, or embedded features, and can be scaled to handle large datasets.

The above systems and methods may be utilized to efficiently align data sets of scan points captured from multiple different locations, to produce a highly accurate composite scan data set that may be used in manufacturing and maintenance operations on a variety of target objects, including aircraft, rockets, missiles, and satellites, as some examples.

Figure 11:
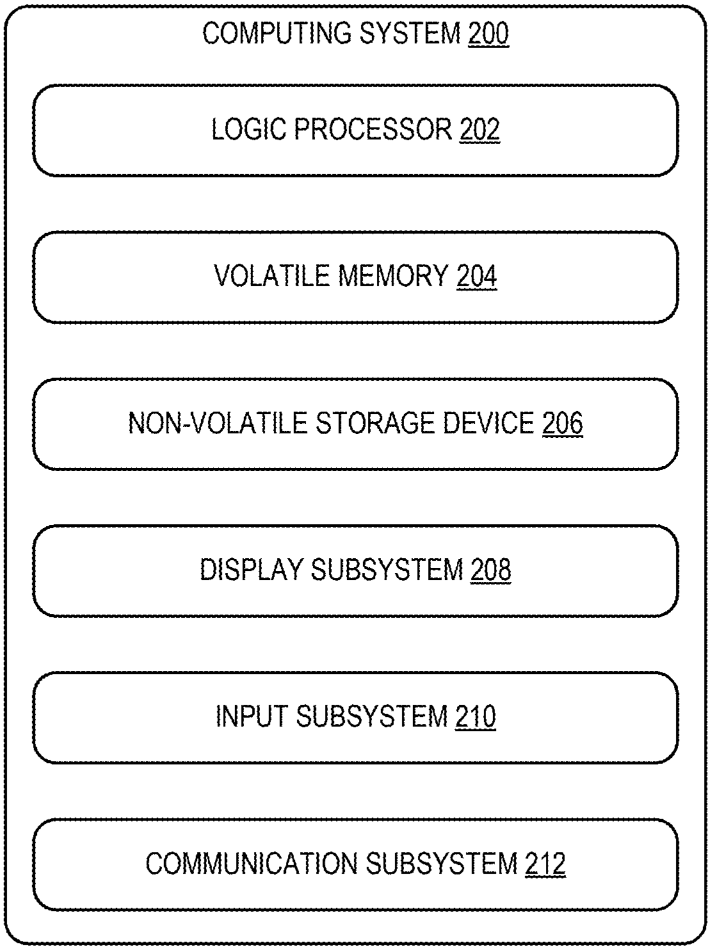
FIG. 11 schematically shows an example computing environment in which the computing system of FIG. 1 can be instantiated.

FIG. 11 schematically shows an example computing environment in which the computing system 10 of FIG. 1 is instantiated. Computing system 200 is shown in simplified form. Computing system 200 can embody the computing system 10 described above and illustrated in FIG. 1. Components of computing system 200 are, for example, included in one or more personal computers, server computers, tablet computers, home-entertainment computers, network computing devices, video game devices, mobile computing devices, mobile communication devices (e.g., smart phone), embedded micro-processors, and/or other computing devices, and wearable computing devices such as smart wristwatches and head mounted augmented reality devices.

Computing system 200 includes a logic processor 202 volatile memory 204, and a non-volatile storage device 206. Computing system 200 optionally includes a display subsystem 208, input subsystem 210, communication subsystem 212, and/or other component.

Logic processor 202 includes one or more physical devices configured to execute instructions. For example, the logic processor 202 is configured to execute instructions that are part of one or more applications, programs, routines, libraries, objects, components, data structures, or other logical constructs. Such instructions are implemented to perform a task, implement a data type, transform the state of one or more components, achieve a technical effect, or otherwise arrive at a desired result.

The logic processor 202 includes one or more physical processors configured to execute software instructions. Additionally, or alternatively, in some examples, the logic processor 202 includes one or more hardware logic circuits or firmware devices configured to execute hardware-implemented logic or firmware instructions. Processors of the logic processor 202 are single-core or multi-core, and the instructions executed thereon are configured for sequential, parallel, and/or distributed processing. Individual components of the logic processor 202 are optionally distributed among two or more separate devices, which in some examples are remotely located and/or configured for coordinated processing. In some examples, aspects of the logic processor 202 are virtualized and executed by remotely accessible, networked computing devices configured in a cloud-computing configuration. In such a case, these virtualized aspects are run on different physical logic processors of various different machines.

Non-volatile storage device 206 includes one or more physical devices configured to hold instructions executable by the logic processors to implement the methods and processes described herein. When such methods and processes are implemented, the state of non-volatile storage device 206 is transformed—e.g., to hold different data.

Non-volatile storage device 206 includes physical devices that are removable and/or built in. Non-volatile storage device 206 can include optical memory, semiconductor memory, and/or magnetic memory, or other mass storage device technology. Non-volatile storage device 206 can include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 includes physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 are, in some examples, integrated together into one or more hardware-logic components. Examples of such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" are used to describe an aspect of computing system 200 typically implemented in software by a processor to perform a particular function using portions of volatile memory, which involves transformative processing that specially configures the processor to perform the function. Thus, a module, program, or engine can be instantiated via logic processor 202 executing instructions held by non-volatile storage device 206, using portions of volatile memory 204. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

A display subsystem 208 is used in some examples to present a visual representation of data held by non-volatile storage device 206. The visual representation, for example, takes the form of a graphical user interface (GUI). In such examples, as the herein described methods and processes change the data held by the non-volatile storage device, and thus transform the state of the non-volatile storage device, the state of display subsystem 208 is likewise be transformed to visually represent changes in the underlying data. Display subsystem 208 includes one or more display devices utilizing virtually any type of display technology. In some examples, such display devices are combined with logic processor 202, volatile memory 204, and/or non-volatile storage device 206 in a shared enclosure. In other examples, such display devices are peripheral display devices.

When included, input subsystem 210 comprises or interfaces with one or more user-input devices such as a keyboard, mouse, touch screen, camera, or microphone.

When included, communication subsystem 212 is configured to communicatively couple various computing devices described herein with each other, and with other devices. Communication subsystem 212, for example, includes one or more wired and/or wireless communication devices compatible with one or more different communication protocols. As non-limiting examples, the communication subsystem is configured for communication via a wired or wireless local- or wide-area network, broadband cellular network, etc. In some embodiments, the communication subsystem allows computing system 200 to send and/or receive messages to and/or from other devices via a network such as the Internet.

Further, the disclosure comprises configurations according to the following clauses.

Clause 1. A computing system for aligning laser scan data, comprising a processor coupled to a memory that stores instructions, which, upon execution by the processor, cause the processor to: obtain multiple scan point sets, each set including a plurality of scan points that represent an outer surface of a target object; generate a voxel map including an outer surface voxel layer for the target object; compute a respective transformation matrix for each of the scan point sets of scan points that fits the scan points in each set to positions within the outer surface voxel layer; apply the respective transformation matrix for each scan point set to the scan points in the respective scan point set to thereby transform a position of each of the scan points in each scan point set that lies partially or wholly outside of the outer surface voxel layer to a modified position within the outer surface voxel layer, to thereby generate respective transformed scan point sets containing the scan points at the modified positions; and output the transformed scan point sets.

Clause 2. The computing system of Clause 1, wherein the processor is configured to remove anomalies in each respective scan point set prior to computing each respective transformation matrix.

Clause 3. The computing system of any of Clauses 1-2, wherein for each scan point set, to compute the transformation matrix, the processor is configured to perform a fit error minimization operation.

Clause 4. The computing system of Clause 3, wherein to accomplish the fit error minimization operation, the processor is configured to: for each scan point set, iteratively: determine a gradient vector between each scan point in the respective scan point set and a closest respective voxel in the outer surface voxel layer; compute a candidate transformation matrix according to a parameter space search algorithm; compute an alignment score for the respective scan point set based on the gradient vector for each of the scan points in the respective scan point set; and if the alignment score is within a permissible error threshold, cease iterating and output the candidate transformation matrix as the transformation matrix, else, continue iterating.

Clause 5. The computing system of Clause 4, wherein the parameter space search algorithm is an iterative optimization algorithm.

Clause 6. The computing system of Clause 4, wherein the parameter space search algorithm is an exhaustive search algorithm.

Clause 7. The computing system of any of Clauses 1-6, wherein the scan points in each scan point set are defined by vectors originating from a scanning device origin for the scan point set and extending to respective positions of the scan points in three-dimensional space.

Clause 8. The computing system of Clause 7, wherein the scanning device origin for each scan point set is positioned at a respective location external to the target object.

Clause 9. The computing system of any of Clauses 1-8, wherein the target object is an aircraft, rocket, spacecraft, or satellite.

Clause 10. The computing system of any of Clauses 1-9, wherein the transformed scan point sets are output to an application that is configured to assess a condition of the target object.

Clause 11. The computing system of Clause 7, wherein the condition is: whether the target object is built to manufacturing tolerance threshold; or whether the target object has experienced damage that exceeds a damage tolerance threshold.

Clause 12. A computerized method for aligning laser scan data, comprising: obtaining multiple scan point sets, each set including a plurality of scan points that represent an outer surface of a target object; generating a voxel map including an outer surface voxel layer for the target object; computing a respective transformation matrix for each of the scan point sets of scan points that fits the scan points in each set to positions within the outer surface voxel layer; applying the respective transformation matrix for each scan point set to the scan points in the respective scan point set to thereby transform a position of each of the scan points in each scan point set that lies partially or wholly outside of the outer surface voxel layer to a modified position within the outer surface voxel layer, to thereby generate respective transformed scan point sets containing the scan points at the modified positions; and outputting the transformed scan point sets.

Clause 13. The computerized method of Clause 12, further comprising: removing anomalies in each respective scan point set prior to computing each respective transformation matrix.

Clause 14. The computerized method of any of Clauses 11-12, wherein for each of the scan point sets, computing the transformation matrix is performed by a fit error minimization operation.

Clause 15. The computerized method of Clause 14, wherein the fit error minimization operation comprises: for each scan point set, iteratively: determining a gradient vector between each scan point in the respective scan point set and a closest respective voxel in the outer surface voxel layer; computing a candidate transformation matrix according to a parameter space search algorithm; computing an alignment score for the respective scan point set based on the gradient vector for each of the scan points in the respective scan point set; and if the alignment score is within a permissible error threshold, ceasing iterating and outputting the candidate transformation matrix as the transformation matrix, else, continuing iterating.

Clause 16. The computerized method of Clause 15, wherein the parameter space search algorithm is an iterative optimization algorithm.

Clause 17. The computerized method of Clause 15, wherein the parameter space search algorithm is an exhaustive search algorithm.

Clause 18. The computerized method of any of Clauses 12-17, wherein the scan points in each scan point set are defined by vectors originating from a scanning device origin for the scan point set and extending to respective positions of the scan points in three-dimensional space.

Clause 19. The computerized method of any of Clauses 12-18, wherein the transformed scan point sets are output to an application that is configured to assess a condition of the target object, and the condition is: whether the target object is built to manufacturing tolerance threshold; or whether the target object has experienced damage that exceeds a damage tolerance threshold.

Clause 20. A computing system for aligning laser scan data, comprising: a processor coupled to a memory that stores instructions, which, upon execution by the processor, cause the processor to: obtain multiple scan point sets, each set including a plurality of scan points that represent an outer surface of a target object; generate a voxel map including an outer surface voxel layer for the target object; compute, via performing a fit error minimization operation, a respective transformation matrix for each of the scan point sets of scan points that fits the scan points in each set to positions within the outer surface voxel layer, wherein the fit error minimization operation computes an alignment score for the respective scan point set based on a gradient vector for each of the scan points in the respective scan point set; apply the respective transformation matrix for each scan point set to the scan points in the respective scan point set to thereby transform a position of each of the scan points in each scan point set that lies partially or wholly outside of the outer surface voxel layer to a modified position within the outer surface voxel layer, to thereby generate respective transformed scan point sets containing the scan points at the modified positions; and output the transformed scan point sets to an application that is configured to assess a condition of the target object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for aligning laser scan data, comprising:

a processor coupled to a memory that stores instructions, which, upon execution by the processor, cause the processor to:

obtain multiple scan point sets, each set including a plurality of scan points that represent an outer surface of a target object;

generate a voxel map including an outer surface voxel layer for the target object;

compute, via performing a fit error minimization operation, a respective transformation matrix for each of the scan point sets of scan points that fits the scan points in each set to positions within the outer surface voxel layer;

apply the respective transformation matrix for each scan point set to the scan points in the respective scan point set to thereby transform a position of each of the scan points in each scan point set that lies partially or wholly outside of the outer surface voxel layer to a respective modified position within the outer surface voxel layer, to thereby generate respective transformed scan point sets containing each scan point at the respective modified position; and output the transformed scan point sets, wherein the fit error minimization operation comprises, for each scan point set, iteratively:

determining a gradient vector between each scan point in the respective scan point set and a closest respective voxel in the outer surface voxel layer;

computing a candidate transformation matrix according to a parameter space search algorithm;

computing an alignment score for the respective scan point set based on the gradient vector for each of the scan points in the respective scan point set; and if the alignment score is within a permissible error threshold, ceasing iterating and outputting the candidate transformation matrix as the transformation matrix, else, continuing iterating.

2. The computing system of claim 1, wherein the processor is configured to remove anomalies in each respective scan point set prior to computing each respective transformation matrix.

3. The computing system of claim 1, wherein the parameter space search algorithm is an iterative optimization algorithm.

4. The computing system of claim 1, wherein the parameter space search algorithm is an exhaustive search algorithm.

5. The computing system of claim 1, wherein the scan points in each scan point set are defined by vectors originating from a scanning device origin for the scan point set and extending to respective positions of the scan points in three-dimensional space.

6. The computing system of claim 5, wherein the scanning device origin for each scan point set is positioned at a respective location external to the target object.

7. The computing system of claim 1, wherein the target object is an aircraft, rocket, spacecraft, or satellite.

8. The computing system of claim 1, wherein the transformed scan point sets are output to an application that is configured to assess a condition of the target object.

9. The computing system of claim 8, wherein the condition is:

whether the target object is built to manufacturing tolerance threshold; or whether the target object has experienced damage that exceeds a damage tolerance threshold.

10. The computing system of claim 1, wherein the alignment score is a root mean square (RMS) score computed based on voxel-based proximity information for the scan points.

11. The computing system of claim 1, wherein the fit error minimization operation further comprises terminating iteration upon reaching a maximum number of iterations.

12. A computerized method for aligning laser scan data, comprising:

obtaining multiple scan point sets, each set including a plurality of scan points that represent an outer surface of a target object;

generating a voxel map including an outer surface voxel layer for the target object;

computing, via performing a fit error minimization operation, a respective transformation matrix for each of the scan point sets of scan points that fits the scan points in each set to positions within the outer surface voxel layer;

applying the respective transformation matrix for each scan point set to the scan points in the respective scan point set to thereby transform a position of each of the scan points in each scan point set that lies partially or wholly outside of the outer surface voxel layer to a respective modified position within the outer surface voxel layer, to thereby generate respective transformed scan point sets containing each scan point at the respective modified position; and outputting the transformed scan point sets, wherein the fit error minimization operation comprises, for each scan point set, iteratively:

determining a gradient vector between each scan point in the respective scan point set and a closest respective voxel in the outer surface voxel layer;

computing a candidate transformation matrix according to a parameter space search algorithm;

computing an alignment score for the respective scan point set based on the gradient vector for each of the scan points in the respective scan point set; and if the alignment score is within a permissible error threshold, ceasing iterating and outputting the candidate transformation matrix as the transformation matrix, else, continuing iterating.

13. The computerized method of claim 12, further comprising:

removing anomalies in each respective scan point set prior to computing each respective transformation matrix.

14. The computerized method of claim 12, wherein the parameter space search algorithm is an iterative optimization algorithm.

15. The computerized method of claim 12, wherein the parameter space search algorithm is an exhaustive search algorithm.

16. The computerized method of claim 12, wherein the scan points in each scan point set are defined by vectors originating from a scanning device origin for the scan point set and extending to respective positions of the scan points in three-dimensional space.

17. The computerized method of claim 12, wherein the transformed scan point sets are output to an application that is configured to assess a condition of the target object, and the condition is:

whether the target object is built to manufacturing tolerance threshold; or whether the target object has experienced damage that exceeds a damage tolerance threshold.

18. The computerized method of claim 12, wherein the alignment score is a root mean square (RMS) score computed based on voxel-based proximity information for the scan points.

19. The computerized method of claim 12, wherein the fit error minimization operation further comprises terminating iteration upon reaching a maximum number of iterations.

20. A computing system for aligning laser scan data, comprising:

a processor coupled to a memory that stores instructions, which, upon execution by the processor, cause the processor to:

obtain multiple scan point sets, each set including a plurality of scan points that represent an outer surface of a target object;

generate a voxel map including an outer surface voxel layer for the target object;

compute, via performing a fit error minimization operation, a respective transformation matrix for each of the scan point sets of scan points that fits the scan points in each set to positions within the outer surface voxel layer, wherein the fit error minimization operation computes an alignment score for the respective scan point set based on a gradient vector for each of the scan points in the respective scan point set;

apply the respective transformation matrix for each scan point set to the scan points in the respective scan point set to thereby transform a position of each of the scan points in each scan point set that lies partially or wholly outside of the outer surface voxel layer to a respective modified position within the outer surface voxel layer, to thereby generate respective transformed scan point sets containing each scan point at the respective modified position; and output the transformed scan point sets to an application that is configured to assess a condition of the target object, wherein the fit error minimization operation comprises, for each scan point set, iteratively:

determining a gradient vector between each scan point in the respective scan point set and a closest respective voxel in the outer surface voxel layer;

computing a candidate transformation matrix according to a parameter space search algorithm;

computing an alignment score for the respective scan point set based on the gradient vector for each of the scan points in the respective scan point set; and if the alignment score is within a permissible error threshold, ceasing iterating and outputting the candidate transformation matrix as the transformation matrix, else, continuing iterating.

* * * * *